United States Patent [19]

Wolf

[11] Patent Number: 4,478,031
[45] Date of Patent: Oct. 23, 1984

[54] LAWNMOWERS WITH ROTATABLE CUTTING BLADES

[75] Inventor: Elmar Wolf, Wissembourg, France

[73] Assignee: Outils Wolf, Sarl, Wissembourg, France

[21] Appl. No.: 404,972

[22] Filed: Aug. 4, 1982

[30] Foreign Application Priority Data

Aug. 5, 1981 [FR] France ................. 81 15489

[51] Int. Cl.³ .............................................. A01D 53/06
[52] U.S. Cl. .................................. 56/202; 56/DIG. 18
[58] Field of Search ................ 56/202, 16.6, 320.2, 56/320.1, DIG. 18

[56] References Cited

U.S. PATENT DOCUMENTS

| | | | |
|---|---|---|---|
| 2,887,839 | 5/1959 | Pommer | 56/202 |
| 2,910,818 | 11/1959 | Bech et al. | 56/320.2 |
| 2,955,404 | 10/1960 | Strasel et al. | 56/202 |
| 2,970,421 | 2/1961 | Krewson . | |
| 3,222,853 | 12/1965 | Michael | 56/202 |
| 3,636,686 | 1/1972 | Meyer et al. | 56/320.2 |
| 4,064,680 | 12/1977 | Fleigle | 56/320.2 |
| 4,238,918 | 12/1980 | Sarahashé | 56/202 |
| 4,345,418 | 8/1982 | Arizpe | 56/202 |

FOREIGN PATENT DOCUMENTS

| | | | |
|---|---|---|---|
| 274909 | of 1965 | Australia | 56/202 |
| 282007 | of 1966 | Australia | 56/202 |
| 452098 | 12/1973 | Australia . | |
| 953114 | 8/1974 | Canada . | |
| 47415 | 3/1982 | European Pat. Off. | 56/320.2 |
| 1812908 | 8/1969 | Fed. Rep. of Germany . | |
| 1509683 | 12/1967 | France . | |
| 1553596 | 12/1968 | France . | |
| 2247152 | 5/1975 | France . | |
| 1429567 | 3/1976 | United Kingdom . | |

Primary Examiner—Gene Mancene
Assistant Examiner—John G. Weiss
Attorney, Agent, or Firm—Young & Thompson

[57] ABSTRACT

A lawnmower with rotating cutting blades has a central handle (1) provided with a hook (2) for mounting a grass collecting receptacle (3). The central handle (1) is so shaped and arranged as to permit easy lateral access during removal and replacement of the receptacle (3). The receptacle (3) is provided with a metal bail (4) for securement to the hook (2) of the handle (1). The base (6) of the central handle (1) pivotally supports a deflector (5) held in operative position by means of a strap (24) secured to the hook (2) of the central handle (1).

1 Claim, 8 Drawing Figures

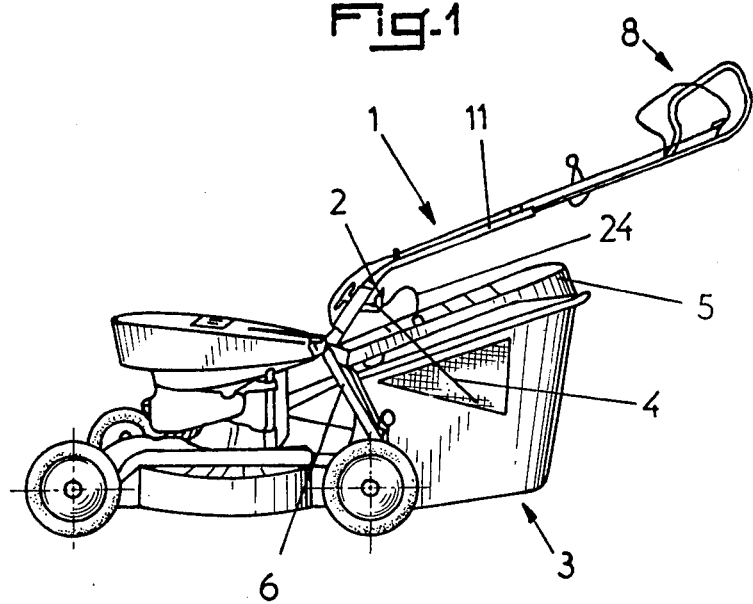
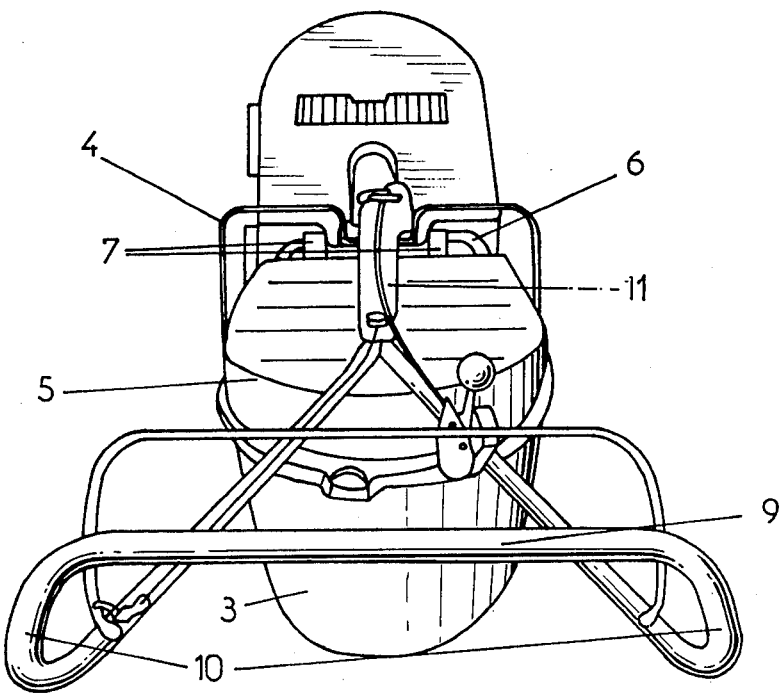

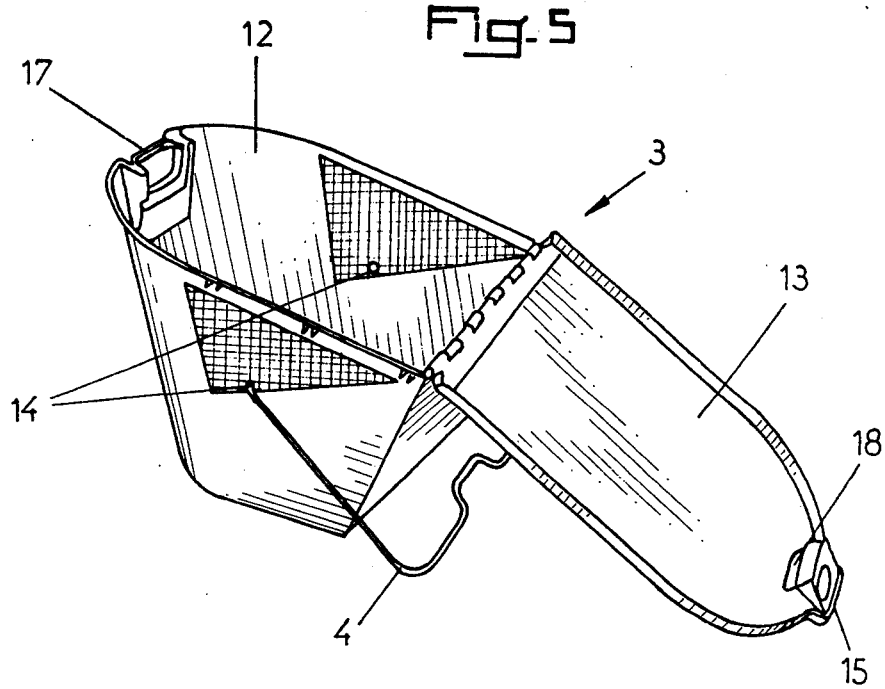
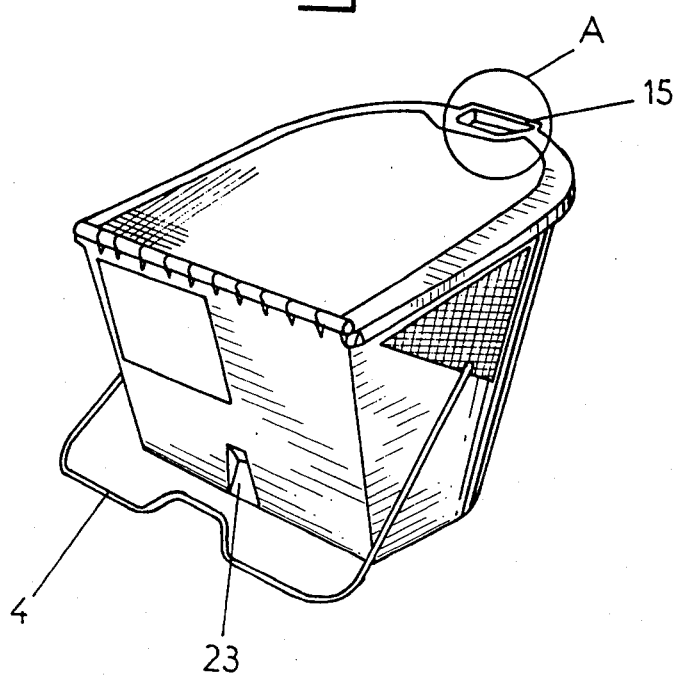

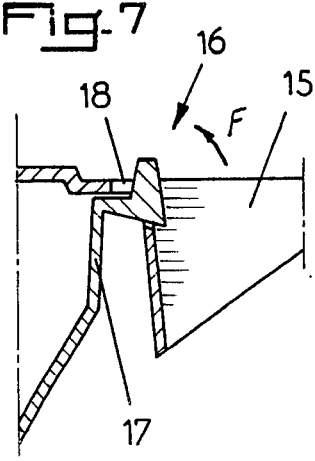
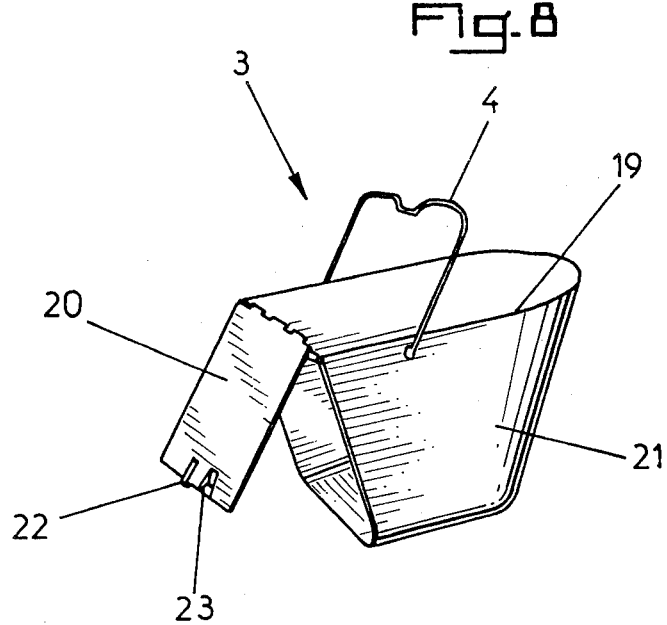

LAWNMOWERS WITH ROTATABLE CUTTING BLADES

The present invention relates to the field of construction of lawnmowers, particularly with rotating cutting blades, and has for its object improvements in such mowers.

The lawnmowers of known types are generally provided with a handle with two parallel shafts and a receptacle for collecting the cut grass in the form of a rigid basket or a grass bag, a removable deflector being adapted to be secured to the outlet of the ejection passage for the cut grass, in case of non-use of the collection receptacle.

However, existing handles do not permit easy access to the collection receptacle, to enable its emplacement or removal, except in the middle, which is to say at an incline above the crosspiece of the handle connecting the two parallel shafts, this arrangement requiring several disengaging or engaging operations. Moreover, these grass collecting receptacles, which are hooked on over the ejection passage, and therefore mounted eccentrically, are difficult to manipulate, particularly to empty them, and their securement is unreliable, an engagement on a boss, or the like, which may come off upon pivoting.

Moreover, the use of a deflector requires a preliminary operation for emplacing the latter, the motor being stopped, the reverse operation being necessarily effectuated for again using the collection receptacle.

The present invention has for its object the remedy of these drawbacks.

Thus it has for its object improvements in lawnmowers with rotating blades characterized in that the handle is a central handle, provided with a hook for mounting the collection receptacle, and permitting easy lateral access upon uncoupling and during replacement of the said receptacle, in that the collecting receptacle is provided with a metal bail for securement to the hook of the handle, and that on the base of the central handle is pivotally mounted a deflector that is retained in operating position by means of a strap secured to the hook of the central handle.

The invention will be better understood from the following description, which relates to a preferred embodiment, given by way of non-limiting example, and explained with reference to the accompanying schematic drawings, in which:

FIG. 1 is a perspective view of a mower provided with improvements according to the invention;

FIG. 2 is an upper rear perspective view showing the central handle;

FIG. 5 is a perspective view of a rigid grass basket in open position;

FIG. 6 is a view similar to that of FIG. 5 of the basket in closed position;

FIG. 7 is a cross-sectional view of detail A of FIG. 6; and

FIG. 8 is a perspective view of a grass bag.

Figure 3:
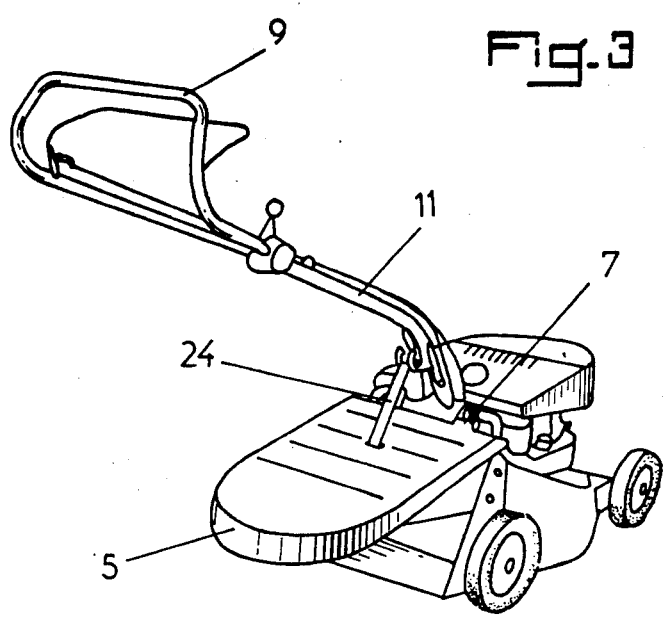
FIG. 3 is a rear perspective view showing the mower with the deflector in operating position.
Figure 4:
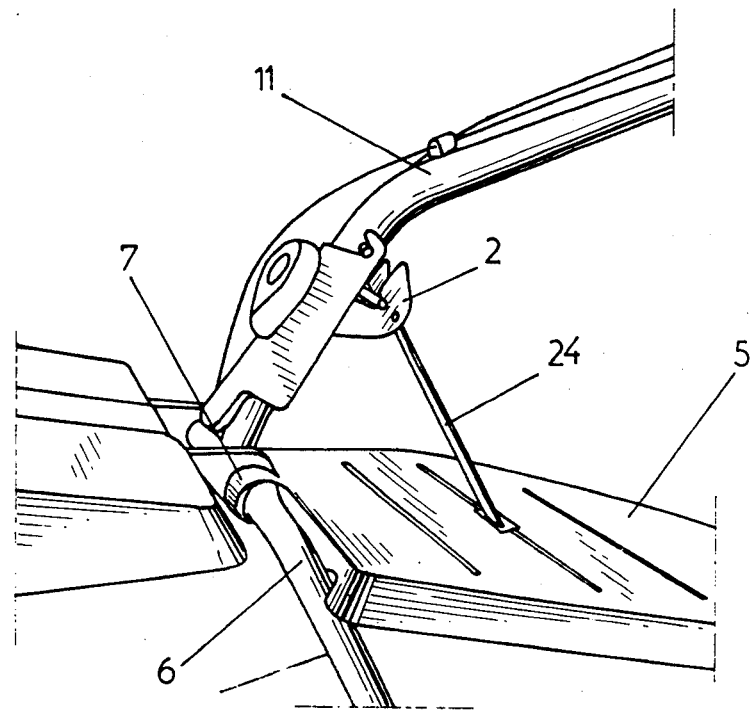
FIG. 4 is a fragmentary perspective view showing the articulation of the deflector to the base of the central handle.

According to the invention, and as is shown more particularly, by way of example, in FIG. 1 of the accompanying drawings, the improvements in lawnmowers with rotating blades are characterized in that the handle is a central handle 1 provided with a hook 2 for attachment of the collection receptacle 3, in that the latter is provided with a metal bail 4 for securement to the hook 2 of handle 1, and in that a deflector 5 is pivotally mounted on the base 6 of handle 1 and is retained in operative position (FIGS. 3 and 4) by means of a strap 24 secured to the hook of handle 1.

The central handle 1 is fixed to the chassis of the mower by means of its base 6, in the form of a lower yoke having two coaxial cylindrical portions 7 serving for pivotal mounting of the deflector 5, and is provided at its upper part with a hand grip portion 8 preferably having the form of an ergonometrically favorable triangle, which hand grip portion 8 is comprised by a rear raised crosspiece 9 and by lateral inwardly inclined risers 10 and connected to a central sleeve 11 constituted by a single or double hollow profile, on which is secured the hook 2, and whose other end is connected to the base 6.

Thanks to the particular geometry of this handle 1, the user has a very substantial lateral access for disengaging or engaging the collection receptacle 3.

The latter, which may have either the form of a rigid basket (FIGS. 1, 2, 5 and 6), or that of a bag (FIG. 8) is secured to the outlet of the grass ejection passage and to the handle 1 by means of its metal bail 4 coacting with the hook 2.

FIGS. 5 and 6 show a rigid basket according to the invention, constituted by a receptacle 12 on which is swingably mounted a cover 13, the bail 4 for securement to the handle 1 being pivotally mounted at 14 on the receptacle 12. On the other side of the pivot between the cover 13 and the receptacle 12, the cover 13 is provided with a handle 15 provided with an automatic locking device 16 (FIG. 7) constituted by a snap 17 secured to receptacle 12 and having snap engagement in a recess 18 in the form of a clasp for the cover 13 in closed position. Unlocking of the cover 13 is effectuated by simple pressure on the end of snap 17 in the direction of arrow F. In known manner, the receptacle 12 and the cover 13 are preferably provided with screens permitting outlet of the air while retaining the cut grass.

In the case in which the collection receptacle is in the form of a grass bag, the latter is preferably constituted by a metal frame 19, by a forward rigid flap 20 for securement to the opening of the outlet passage for grass, and by a cloth enclosure 21 about the side and lower faces, the bottom being reinforced by a sheet of plastic.

The front flap 20 is articulated on metal frame 19, and provided on its other side with a snap-lock 22, analogous to that of the rigid basket, and a bail 4 is also pivotally secured on frame 19.

According to another characteristic of the invention, on the front side of receptacle 12 of the rigid basket as well as on the front flap 20 of the grass bag, there is provided, near the lower edge, a recess 23, for example of pyramidal form, adapted to surround a lug of complementary shape on the body of the mower, during emplacement of the receptacle, and ensuring the centering of the latter.

The deflector 5 is preferably of blow-molded high density polyethylene and has on its lower side a downwardly interrupted profile adapted to deflect the cut grass toward the ground in case the receptacle 3 is not used. Deflector 5 is pivoted on the coaxial cylindrical portions 7 of base 6 of handle 1, and the strap 24 connected to hook 2 of handle 1 retains said deflector 5 in operative position in the absence of receptacle 3.

Deflector 5 is shaped and arranged so as to cover the entire ejection zone located in prolongation of the ejection passage of the mower. For this reason, the mower may be used without collection receptacle and without the mounting of a removable deflector, and during use of a receptacle, it suffices to engage the deflector 5 between the bail 4 and the receptacle 3, the lower profile of the deflector 5 tending then to evacuate air and dust through the lateral openings thus provided.

Of course, the invention is not limited to the embodiment described and shown in the accompanying drawings. Modifications are possible, particularly with respect to the construction of the various elements, or by substitution of technical equivalents, without thus departing from the field of protection of the invention.

What is claimed is:

1. In a lawnmower with rotating cutting blades, a central handle, a collection receptacle, a hook on the central handle, a metal bail on the collection receptacle that engages the hook, and a pivotal grass deflector; the improvement in which the central handle has a base in the form of a yoke comprised by two spaced cylindrical coaxial portions, the deflector being pivotally mounted on said portions, the upper end of the handle being of triangular shape and having a raised cross piece and lateral risers connected to one end of a central sleeve on which is fixed said hook and whose other end is connected to said base, said lateral risers being inclined toward each other in the direction of said crosspiece, the deflector being of blow molded high density polyethylene having on its lower surface a downwardly interrupted profile adapted to deflect cut grass toward the ground when said receptacle is not used.

* * * * *